US008065279B2

United States Patent
Errickson et al.

(10) Patent No.: US 8,065,279 B2
(45) Date of Patent: Nov. 22, 2011

(54) PERFORMANCE NEUTRAL HEARTBEAT FOR A MULTI-TASKING MULTI-PROCESSOR ENVIRONMENT

(75) Inventors: Richard K. Errickson, Poughkeepsie, NY (US); Leornard W. Helmer, Jr., Stone Ridge, NY (US); John S. Houston, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 12/036,983

(22) Filed: Feb. 25, 2008

(65) Prior Publication Data

US 2009/0217291 A1 Aug. 27, 2009

(51) Int. Cl.
*G06F 17/00* (2006.01)
(52) U.S. Cl. ...................................................... 707/687
(58) Field of Classification Search ............... 707/610, 707/661, 687, 737, 748, 752, 791, 802
See application file for complete search history.

(56) References Cited

U.S. PATENT DOCUMENTS

| | | | |
|---|---|---|---|
| 3,643,227 A | 2/1972 | Smith et al. | |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,524,212 A | 6/1996 | Somani et al. | |
| 5,777,987 A | 7/1998 | Adams et al. | |
| 6,073,181 A | 6/2000 | Holland et al. | |
| 6,181,677 B1 * | 1/2001 | Valli et al. | 370/228 |
| 6,289,386 B1 | 9/2001 | Vangemert | |
| 6,363,457 B1 | 3/2002 | Sundberg | |
| 6,483,804 B1 | 11/2002 | Muller et al. | |
| 6,507,567 B1 | 1/2003 | Willars | |
| 6,741,552 B1 | 5/2004 | McCrosky et al. | |
| 6,862,609 B2 | 3/2005 | Merkey | |
| 6,993,032 B1 | 1/2006 | Dammann et al. | |
| 7,093,024 B2 | 8/2006 | Craddock et al. | |
| 7,200,704 B2 | 4/2007 | Njoku et al. | |
| 7,283,473 B2 | 10/2007 | Arndt et al. | |
| 7,290,077 B2 | 10/2007 | Gregg et al. | |
| 7,366,813 B2 | 4/2008 | Gregg et al. | |
| 7,467,402 B2 | 12/2008 | Pennington et al. | |
| 7,602,774 B1 | 10/2009 | Sundaresan et al. | |
| 7,613,183 B1 | 11/2009 | Brewer et al. | |
| 2001/0014954 A1 | 8/2001 | Purcell et al. | |

(Continued)

OTHER PUBLICATIONS

Jeong et al.; A study on TCP Buffer Management Algorithim for Improvement on Network Performance in Grid Environment; Jun. 6-9, 2004 pp. 281-288.

(Continued)

*Primary Examiner* — Fred I Ehichioya
(74) *Attorney, Agent, or Firm* — Cantor Colburn LLP; Steven Chiu

(57) ABSTRACT

A computer program product, apparatus and method for providing a performance neutral heartbeat in a computer communication system, the computer program product including a tangible storage medium readable by a processing circuit and storing instructions for execution by the processing circuit for performing a method including maintaining a send flag, maintaining a receive flag, determining that a heartbeat timer has activated, checking a state of the send flag to determine if packets have been sent since a prior heartbeat timer activation and checking a state of the receive flag to determine if packets have been received since a prior heartbeat timer activation.

20 Claims, 6 Drawing Sheets

U.S. PATENT DOCUMENTS

| | | |
|---|---|---|
| 2001/0030943 A1 | 10/2001 | Gregg et al. |
| 2002/0107903 A1 | 8/2002 | Richter et al. |
| 2002/0194245 A1 | 12/2002 | Simpson et al. |
| 2003/0005039 A1 | 1/2003 | Craddock et al. |
| 2003/0018828 A1 | 1/2003 | Craddock et al. |
| 2003/0061379 A1 | 3/2003 | Craddock et al. |
| 2004/0123068 A1 | 6/2004 | Hashimoto |
| 2004/0202189 A1 | 10/2004 | Arndt et al. |
| 2004/0221070 A1 | 11/2004 | Ortega, III et al. |
| 2005/0018669 A1 | 1/2005 | Arndt et al. |
| 2005/0060374 A1 | 3/2005 | Phillips |
| 2005/0060445 A1 | 3/2005 | Beukema et al. |
| 2005/0120237 A1 | 6/2005 | Roux et al. |
| 2005/0144313 A1 | 6/2005 | Arndt et al. |
| 2006/0048214 A1 | 3/2006 | Pennington et al. |
| 2006/0176167 A1* | 8/2006 | Dohrmann .................. 340/506 |
| 2006/0230185 A1 | 10/2006 | Errickson et al. |
| 2006/0230209 A1 | 10/2006 | Gregg et al. |
| 2006/0230219 A1 | 10/2006 | Njoku et al. |
| 2007/0239963 A1 | 10/2007 | Yao et al. |
| 2007/0245050 A1 | 10/2007 | Gregg et al. |
| 2008/0028116 A1 | 1/2008 | Gregg et al. |
| 2008/0109891 A1 | 5/2008 | Greenwald et al. |
| 2008/0196041 A1 | 8/2008 | Gregg et al. |
| 2009/0094603 A1 | 4/2009 | Hiltgen et al. |

OTHER PUBLICATIONS

Huang et al., InfiniBand Support in Xen Virtual Machine Environmant, Technical Report, OSU-CISRC-10/05-TR63, Oct. 2005.

"Infiniband Architecture Specification vol. 1", Release 1.0.a, Jun. 19, 2001, pp. 40, 71, 193-194, 366-370, 665-667.

Wu et al., "Design of An InfiniBand Emulator over Myrinet: Challenges, Implementation, and Performance Evaluation", Technical Report, OSU-CISRC-2/01-TR03, 2003.

Non-Final Office Action dated Jun. 23, 2010 for U.S. Appl. No. 12/036,986.
Non-Final Office Action dated Jan. 29, 2010 for U.S. Appl. No. 12/036,979.
Notice of Allowance dated Jun. 23, 2010 for U.S. Appl. No. 12/036,979.
Non-Final Office Action dated Oct. 1, 2010 ffor U.S. Appl. No. 12/037,046.
Non-Final Office Action dated May 17, 2010 for U.S. Appl. No. 12/037,046.
Office Action made Final dated Oct. 6, 2010 for U.S. Appl. No. 12/037,048.
Non-Final Office Action dated Apr. 9, 2010 for U.S. Appl. No. 12/037,048.
Office Action Made Final dated Aug. 12, 2010 for U.S. Appl. No. 12/051,634.
Non-Final Office Action dated Mar. 22, 2010 for U.S. Appl. No. 12/051,634.
Non-Final Office Action dated May 13, 2010 for U.S. Appl. No. 12/051,631.
Non-Fianl Office Action dated Jun. 1, 2010 for U.S. Appl. No. 12/051,630.
Office Action made Final dated Dec. 8, 2010 for U.S. Appl. No. 12/036,986.
Notice of Allowance dated Feb. 7, 2011 for U.S. Appl. No. 12/036,979.
Notice of Allowance dated Jan. 11, 2011 for U.S. Appl. No. 12/037,048.
Notice of Allowance dated Oct. 15, 2010 for U.S. Appl. No. 12/051,631.
Final Office dated Nov. 12, 2010 for U.S. Appl. No. 12/051,630.
Notice of Allowance dated Apr. 22, 2011 for U.S. Appl. No. 12/037,046.
Non-Final Office Action dated Jul. 6, 2011 for U.S. Appl. No. 12/051,628.

* cited by examiner

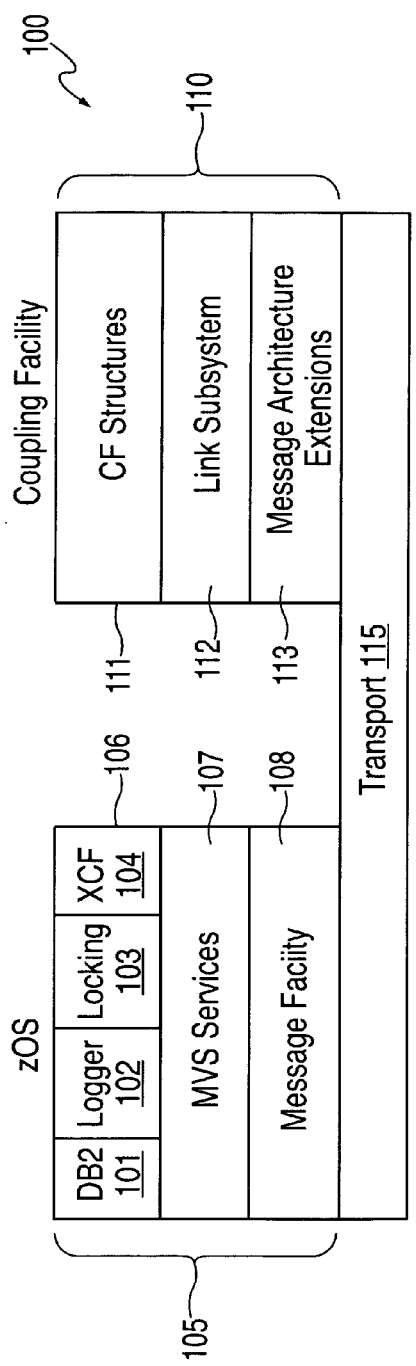
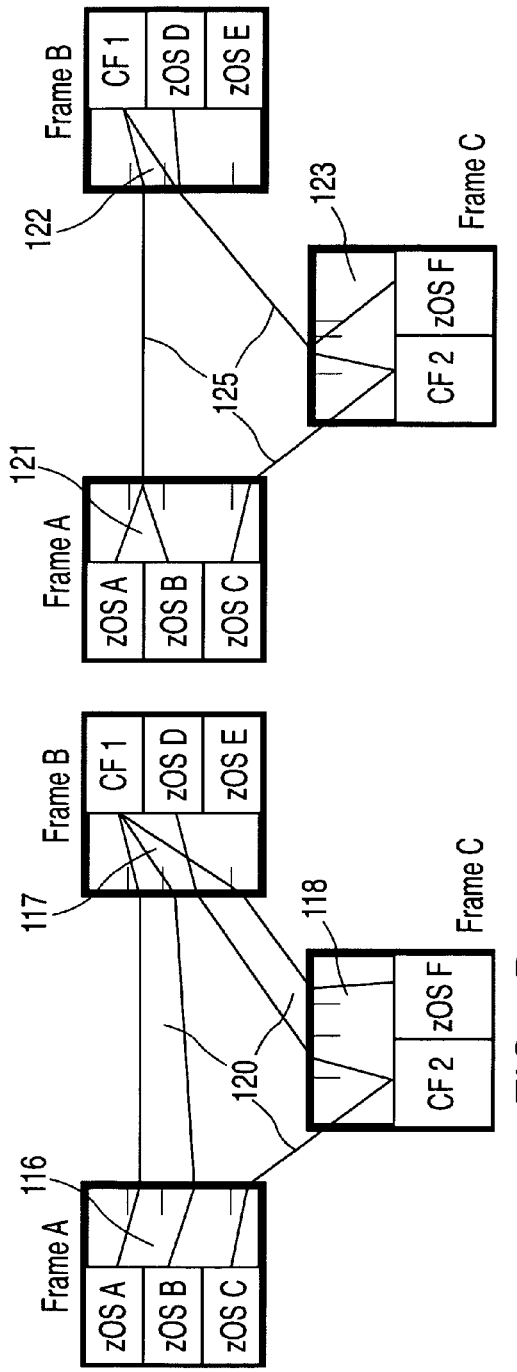

PERFORMANCE NEUTRAL HEARTBEAT FOR A MULTI-TASKING MULTI-PROCESSOR ENVIRONMENT

BACKGROUND OF THE INVENTION

1. Field of Invention

The present disclosure relates generally to multi-tasking multiprocessor systems, and in particular, to a performance neutral heartbeat for a multi-tasking multiprocessor environment.

2. Description of Background

In many mainframe computers, multiple processors are joined into a single unit, sharing the same name and data sets. Such multi-tasking, multi-processor systems represent an instance of a computer system running on one or more physical computers. These multiple mainframes may act as a single mainframe. Such systems can be broken down into LPARs, or logical partitions, each running a different operating system.

InfiniBand (IB), which is a form of System Area Network (SAN), defines a multicast facility that allows a Channel Adapter (CA) to send a packet to a single address and have it delivered to multiple ports. Each multicast group is assigned a unique address, and end-nodes that wish to participate in a multicast group do so via a 'Join' process initiated by the candidate participant with the Subnet Manager. The InfiniBand architecture is described in the InfiniBand standard, which is available at http://www.infinibandta.org and also hereby incorporated by reference.

Currently, many computer communications systems attempt to ensure that any particular connection is still viable. Ensuring for viability can typically be performed at any layer, from hardware through upper level software. A common software approach involves sending heartbeat messages and ensuring that a response is received across the link. In one approach, one end point takes on the role of master, generating the heartbeat messages and checking for responses. The slave end simply receives a heartbeat message responds by sending a heartbeat response message. In another approach, both end points take on both the master and slave roles, generating heartbeat messages, checking for heartbeat responses, and responding to received heartbeat messages by sending a heartbeat response message. One problem that arises from either of these approaches occurs when the traffic level is high. During high traffic times, the heartbeat messages themselves add to the overall congestion on the link.

BRIEF SUMMARY OF THE INVENTION

An exemplary embodiment includes a computer program product for providing a performance neutral heartbeat in a computer communication system, the computer program product including a tangible storage medium readable by a processing circuit and storing instructions for execution by the processing circuit for performing a method including maintaining a send flag, maintaining a receive flag, determining that a heartbeat timer has activated, checking a state of the send flag to determine if packets have been sent since a prior heartbeat timer activation and checking a state of the receive flag to determine if packets have been received since a prior heartbeat timer activation.

Another exemplary embodiment includes a performance neutral heartbeat apparatus for a computer communication system, the apparatus including a communication handler, a send operation residing on the communication handler and configured to set a data sent flag, a receive operation residing on the communication handler and configured to set a data received flag and a timer handler function coupled to the data sent flag and the data receive flag.

A further exemplary embodiment includes a method for providing a performance neutral heartbeat in a computer communication system, the method including maintaining a send flag, maintaining a receive flag, determining that a heartbeat timer has activated, checking a state of the send flag to determine if packets have been sent since a prior heartbeat timer activation and checking a state of the receive flag to determine if packets have been received since a prior heartbeat timer activation.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with an aspect of the present invention, two flags are maintained at each end point, one for send and one for receive. When the system timer pops indicating that it is time to post a heartbeat, the systems and methods described herein perform two operations. First, the software checks the send flag to determine whether any packets have been sent since the last heartbeat timer pop. If the flag is set, then another packet has been sent, so no new message is sent and the software just clears the flag. If the flag is not set, then a heartbeat message is built and sent. Second, the software checks the receive flag to determine whether any packet has been received since the last heartbeat timer pop. If the flag is set, then a packet has been received, so the flag is cleared and the heartbeat state is moved back to idle. If the flag is not set, then no packet has been received, so the heartbeat state is advanced toward a timeout condition. After a predetermined number of consecutive heartbeat intervals with no packets received, the link is determined to no longer be viable. In an exemplary embodiment, the appropriate flags are set whenever messages are sent or received on the link. The systems and methods described herein can be applied to many different environments that need to monitor communications channel viability and can also be applied at many different layers in a given environment. In exemplary embodiments, the health of a channel having multiple connections can also be monitored. For example, a physical link which supports multiple channels that are running across the same fiber can be monitored via the systems and methods described herein.

The systems and methods described herein provide the ability to monitor the viability of the communications link at regular intervals without impacting the performance of that link. When there is little or no data traffic on the link, heartbeat messages will be sent at regular intervals, but at those times there is no data traffic on the link to be impacted.

Figure 1D:
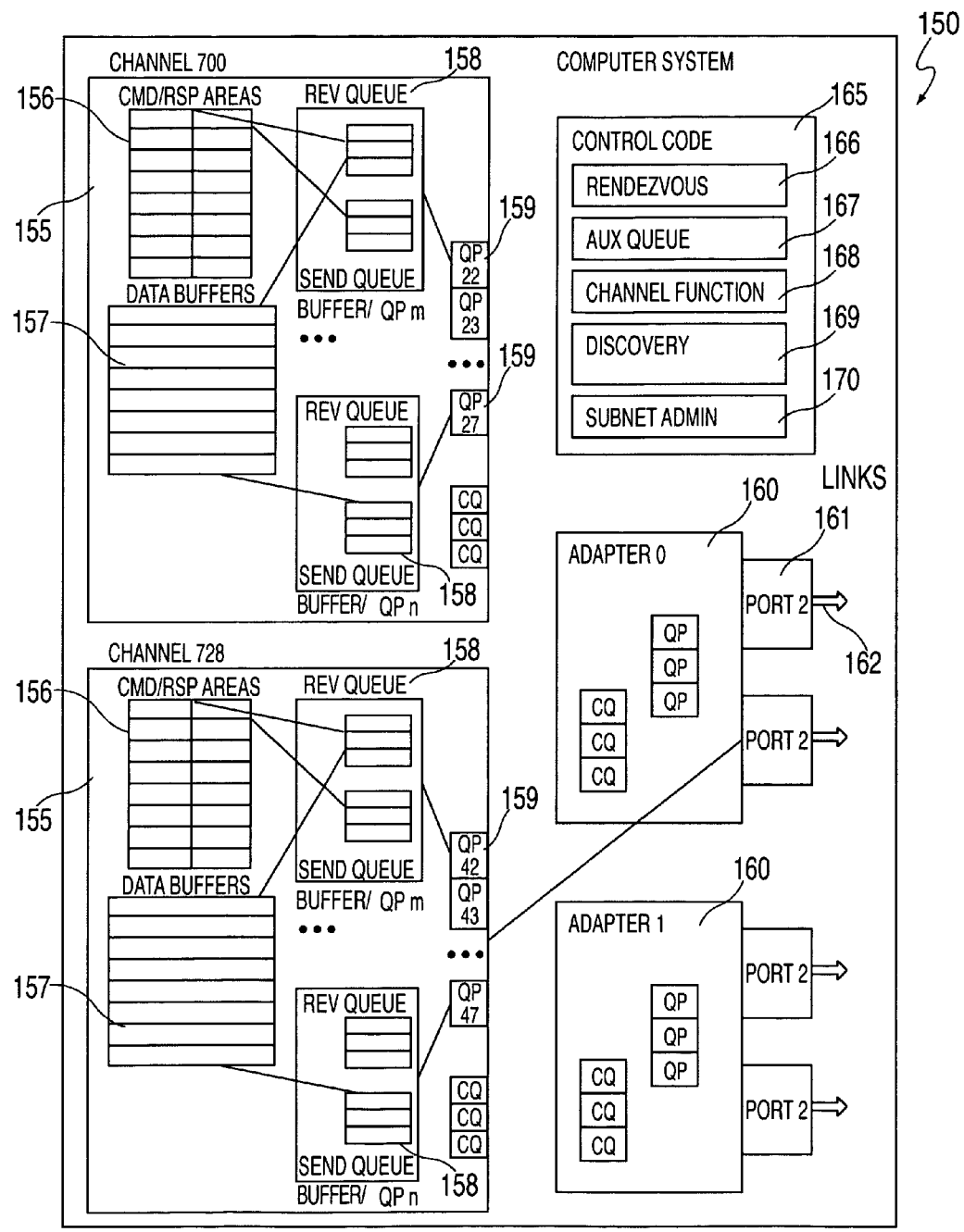
FIG. 1A illustrates an exemplary embodiment of a multi-tasking multi-processor InfiniBand system.
FIG. 1B illustrates an example of a multi-tasking multi-processor environment.
FIG. 1C illustrates an example of a multi-tasking multi-processor environment in accordance with an exemplary embodiment.
FIG. 1 D illustrates an example of a multi-tasking multi-processor environment in accordance with an exemplary embodiment.

FIG. 1A illustrates an exemplary embodiment of a multi-tasking multi-processor InfiniBand system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 implements InfiniBand. FIG. 1B illustrates an example of a multi-tasking multi-processor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multi-tasking multi-processor environment in accordance with an exemplary embodiment. In this example, multiple internal channels 121, 122, 123 share the same physical connection 125. FIG. 1 D illustrates an example of a multi-tasking multi-processor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, as discussed further herein. The channels 155 can further include queue pairs 159 as discussed further herein. The system 150 can further include control code 165 having functions including but not limited to: rendezvous 166, auxiliary queue 167, channel 168, discovery 169 and subnet administrator 170.

Figure 2:
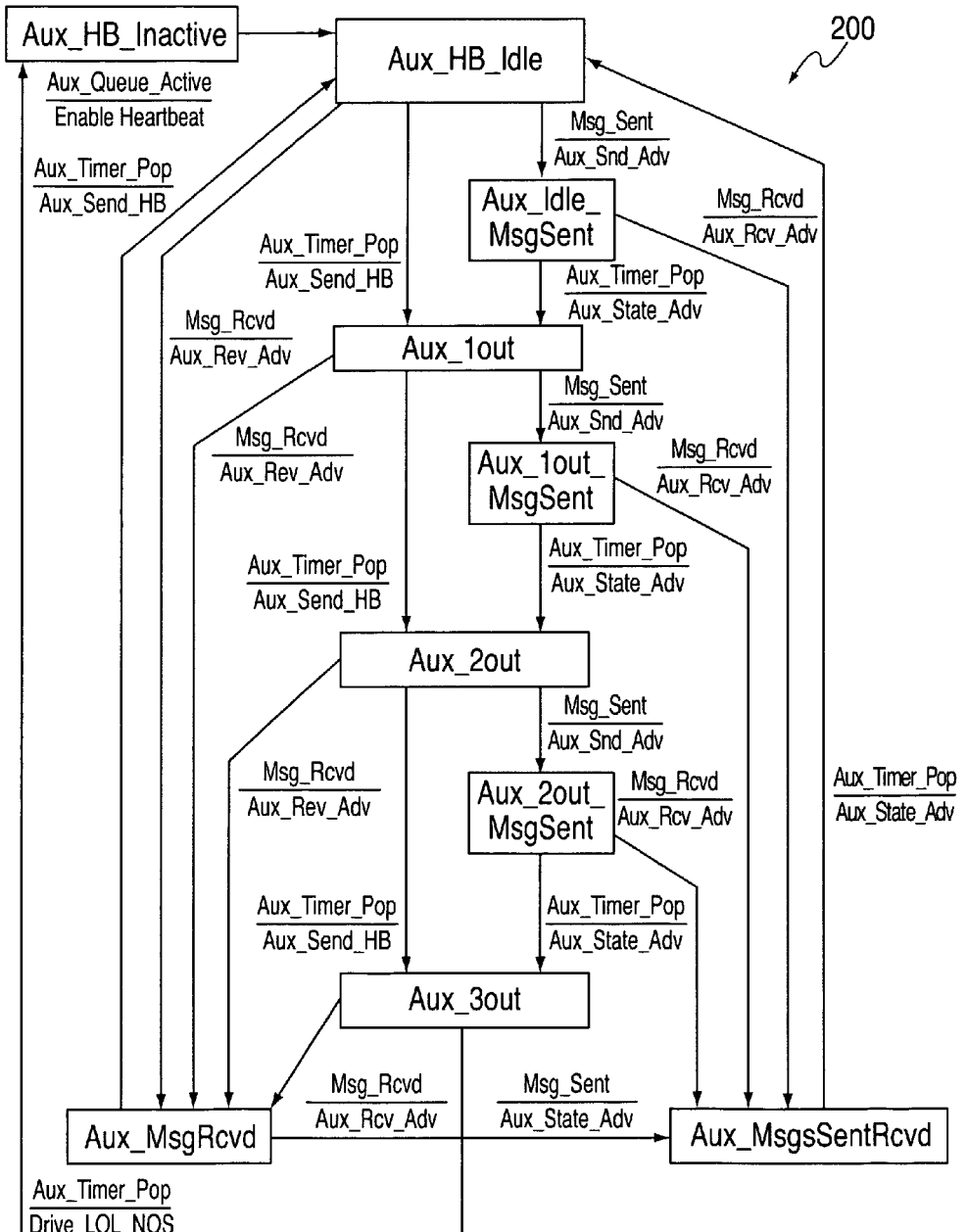
FIG. 2 illustrates a state machine diagram illustrating a flow for a performance neutral heartbeat in accordance with an exemplary embodiment.

FIG. 2 illustrates a state machine diagram illustrating a flow for a performance neutral heartbeat in accordance with an exemplary embodiment. In an exemplary embodiment, when a link is active (i.e., heavy traffic), a heartbeat state starts in an Aux_HB_Idle state. If a message is sent over the link, the state changes to an Aux_Idle_MsgSent state. If a message is then received, the state advances to an Aux_MsgsSentRcvd state. However, if a message is received first, then the state changes to an Aux_MsgRcvd state. Then when a message is sent, the state changes to an Aux_MsgsSentRcvd state. In either of these cases, when the heartbeat timer pops, the state changes to the Aux_HB_Idle state.

In an exemplary embodiment, if the link is quiet, the sequence also starts from the Aux_HB_Idle state, but may proceed down a different path. If no message is sent or received prior to the heartbeat timer pop, then a heartbeat message is sent and the heartbeat state changes to an Aux_1out state. If the link then receives a heartbeat message from the other end point, the state changes to an Aux_MsgRcvd state. The following heartbeat timer pop will then change the state back to Aux_HB_Idle.

In an exemplary embodiment, a fourth heartbeat timer pop can be implemented without receipt of a message from the other end point to declare the link not viable and took action to recover the link. The operations are identical for Aux_HB_Idle, Aux_1out, Aux_2out and Aux_3out. These four states represent the stages moving toward the link not viable condition. 1out indicates that we have had 1 timer pop without receiving a packet. 2out indicates that we have had 2 timer pops without receiving a packet. 3out indicates that we have had 3 timer pops without receiving a packet. Therefore, Aux_Idle_MsgSent, Aux_1out_MsgSent, and Aux_2out_MsgSent are all essentially the same, but carry along the identification of how long it has been since we received the last packet. The nomenclature in FIG. 2 is in the form event/action. The events are Msg_Sent—a message has been sent on the channel, Msg_Rcvd—a message has been received on the channel, Aux_Timer_Pop—the timer associated with the heartbeat has popped, and Aux_Queue_Active—indicates that something has requested that the heartbeat be enabled. The actions that are taken for the specified events are: Enable heartbeat—initialize the controls and set the timer, Aux_Snd_Adv—set a new state to indicate that a message has been sent on the channel, Aux_Rcv_Adv—set a new state to indicate that a message has been received on the channel, Aux_Send_HB—build and send a heartbeat packet and set a new state and clear the flags, Aux_State_Advance—set a new state to indicate that a heartbeat has been processed and clear the flags, and Drive_LOL_NOS—proceed to disable the channel to prevent further use and turn off the heartbeat timer.

Figure 3:
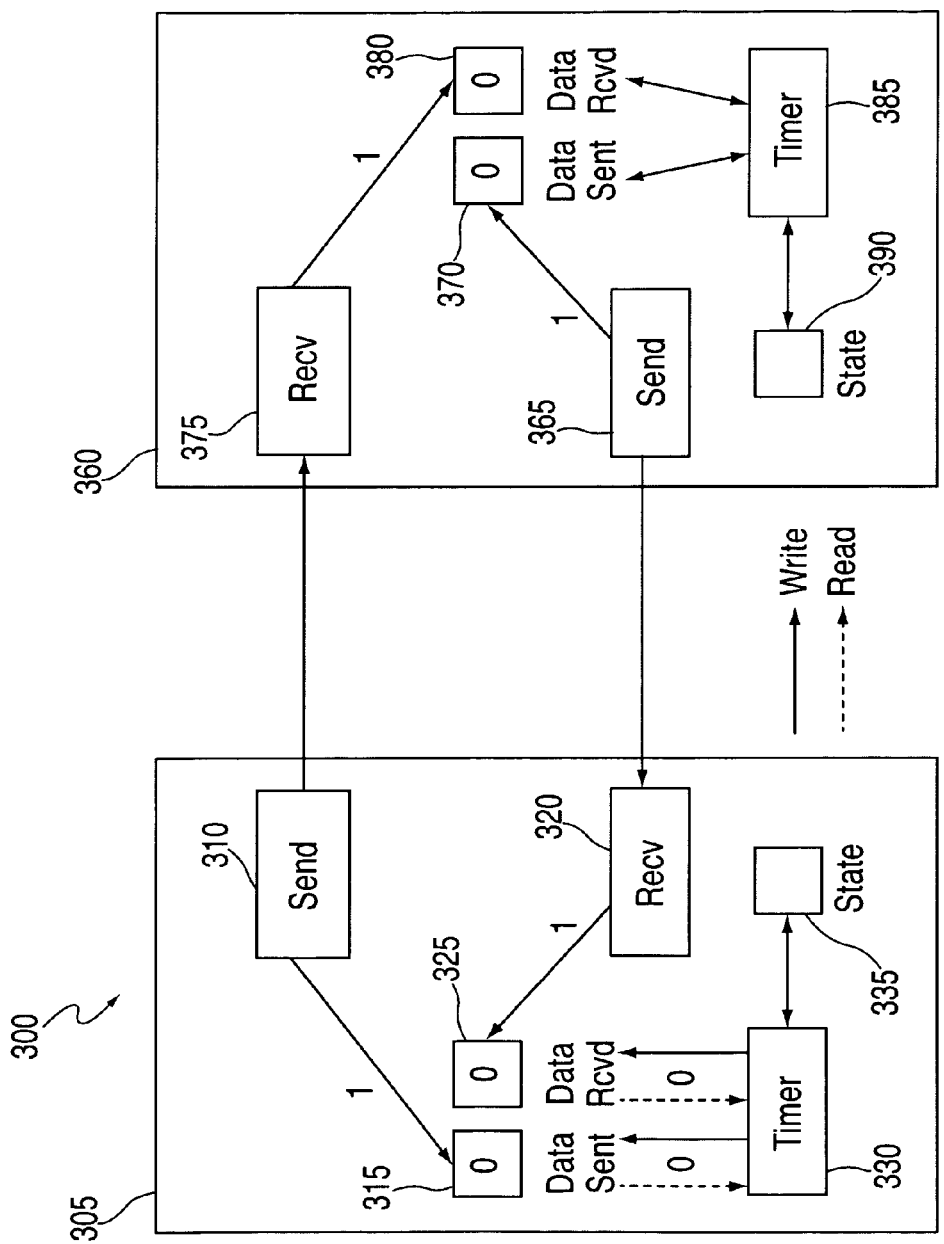
FIG. 3 illustrates a system level block diagram of a performance neutral heartbeat system implemented in a multi-tasking multi-processor environment in accordance with an exemplary embodiment.

FIG. 3 illustrates a system level block diagram of a performance neutral heartbeat system 300 implemented in a multi-tasking multi-processor environment in accordance with an exemplary embodiment. In an exemplary embodiment, the system 300 includes a first communication handler 305 and a second communication handler 360. Each communication handler 305, 360 includes a send operation 310, 365 and a receive operation 320, 375. The send operation 310, 365 is configured to set a data sent flag 315, 370 and the receive operation is configured to set a data received flag 325, 380. The system 300 further includes timer handlers 330, 385 coupled to respective data sent flags 315, 370 and the respective data received flags 325, 380. Each side 305, 360 further includes a state 335, 390 that is updated as described with respect to FIG. 2 above. In an exemplary embodiment, when either side 305, 360 sends a packet, the send operation 310, 365 sets the data sent flag 315, 370. Similarly, when either side 305, 360 receives a packet, the receive operation 320, 375 sets the data received flag 325, 380. In an exemplary embodiment, when the timer pops, the timer handler functions 330, 385 first reads the data sent flags 315, 370 and the data received flags 325, 380. If the respective data sent flag 315, 370 is zero, a heartbeat message is sent over the link. In an exemplary embodiment, the state 335, 390 is updated according to the previously described state machine in FIG. 2. In addition, the data sent flags 315, 370 and the data received flags 325, 380 are set to zero. In exemplary embodiments, the systems and methods described herein therefore limit the amount of traffic generated when a link is already busy, while ensuring that the link is still viable in both directions. If either direction fails to carry data for a prescribed amount of time, the link is deemed to be in error, and recovery actions are taken. For example, the recovery action may be as simple as taking action to prevent further use of the channel, or as complex as shutting down the resources associated with the channel, resetting them, and then attempting to re-establish the channel.

Figure 4:
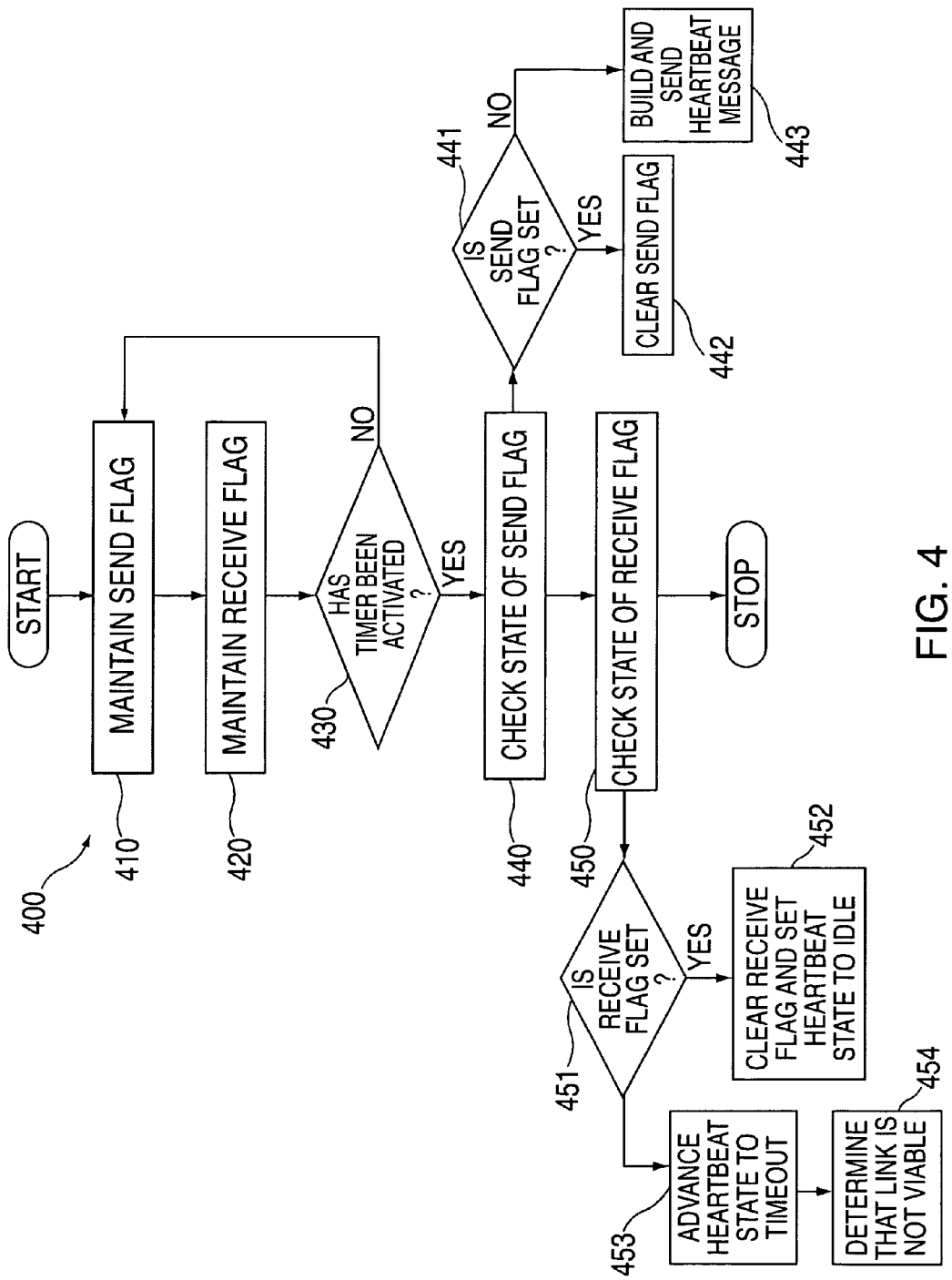
FIG. 4 illustrates a flow chart for a neutral heartbeat method 400 in accordance with an exemplary embodiment.

FIG. 4 illustrates a flow chart for a neutral heartbeat method 400 in accordance with an exemplary embodiment. At block 410, the method 400 maintains a send flag, and at block 420 the method 400 maintains a receive flag. At block 430, the method 400 determines that a heartbeat timer has been activated. At block 440, the method 400 checks a state of the send flag to determine if packets have been sent since a prior heartbeat timer activation. If the send flag is set at block 441, then another packet has been sent, so there is no need to send a new message, and the software clears the send flag at block 442. If the send flag is not set at block 441, then a heartbeat message is built and sent at block 443. At block 450, the method 400 checks a state of the receive flag to determine if packets have been received since a prior heartbeat timer activation. If the receive flag is set at block 451, then a packet has been received, so the receive flag is cleared and the heartbeat state is moved back to idle at block 452. If the flag is not set at block 451, then no packet has been received, so the heartbeat state is advanced toward a timeout condition at block 453. After a predetermined number of consecutive heartbeat intervals with no packets received, the link is determined to no longer be viable at block 454.

Technical effects of exemplary embodiments include the ability to avoid sending heartbeat messages when traffic is already flowing on the link. The embodiments described herein eliminate any need for heartbeat messages to be sent or received when the link is already being used for other messages. The heartbeat function in that case becomes one of monitoring the activity. However, when the level of traffic drops, the heartbeat messages are generated, and only in the direction required, to ensure that the link remains viable.

Figure 5:
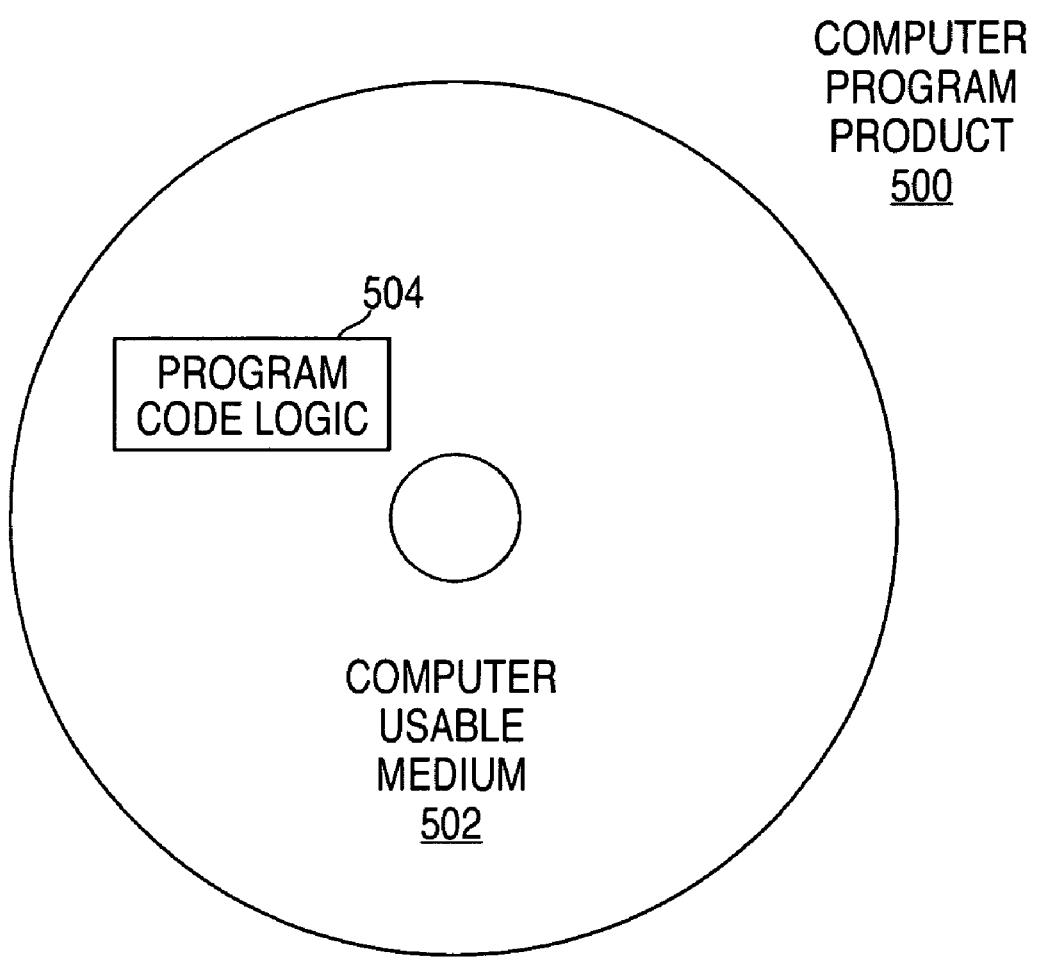
FIG. 5 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for providing a performance neutral heartbeat in a computer communication system having a communications link, the computer program product comprising:
    a tangible storage medium readable by a processing circuit and storing instructions for execution by the processing circuit for performing a method comprising:
    maintaining a send flag;
    maintaining a receive flag;
    determining that a heartbeat timer has activated;
    posting a plurality of system heartbeats;
    for each system heartbeat of the plurality of system heartbeats;
    checking a state of the send flag to determine if packets have been sent since a prior heartbeat timer activation;
    checking a state of the receive flag to determine if packets have been received since a prior heartbeat timer activation, wherein each subsequent system heartbeat of the plurality of system heartbeats includes an identification of an increasing length of time since receipt of a last packet; and
    in response to a passage of a predetermined number of system heartbeats, declaring the communications link not viable and recovering the communications link.

2. The computer program product as claimed in claim 1 wherein the method further comprises in response to the send flag being set, clearing the send flag.

3. The computer program product as claimed in claim 1 wherein the method further comprises in response to the send flag not being set, building a heartbeat message and sending the heartbeat message.

4. The computer program product as claimed in claim 1 wherein the method further comprises in response to the receive flag being set clearing the receive flag.

5. The computer program product as claimed in claim 4 wherein the method further comprises setting a heartbeat state to an idle state.

6. The computer program product as claimed in claim 1 wherein the method further comprises in response to the receive flag not being set setting a heartbeat state to a timeout condition state.

7. The computer program product as claimed in claim 6 wherein the method further comprises counting heartbeat intervals.

8. The computer program product as claimed in claim 7 wherein the method further comprises in response to a passage of a predetermined number of heartbeat intervals, determining that the communications link is not viable.

9. A performance neutral heartbeat apparatus for a computer communication system, the apparatus comprising:
a communication handler;
a send operation residing on the communication handler and configured to maintain and set a data sent flag;
a receive operation residing on the communication handler and configured to maintain and set a data received flag; and
a timer handler function coupled to the data sent flag and the data receive flag, the timer handler function configured to:
post a plurality of system heartbeats;
for each system heartbeat of the plurality of system heartbeats;
check a state of the send flag to determine if packets have been sent since a prior heartbeat timer activation;
check a state of the receive flag to determine if packets have been received since a prior heartbeat timer activation, wherein each subsequent system heartbeat of the plurality of system heartbeats includes an identification of an increasing length of time since receipt of a last packet; and
in response to a passage of a predetermined number of system heartbeats, declare the communications link not viable and recover the communications link.

10. The apparatus as claimed in claim 9 wherein the send operation is configured to set the data sent flag in response to the communication handler sending a data packet on a communication link.

11. The apparatus as claimed in claim 9 wherein the receive operation is configured to set the data received flag in response to the communication handler receiving a data packet on a communication link.

12. The apparatus as claimed in claim 9 wherein the timer handler function is configured to check the data sent flag and the data receive flag in response to a pop of a heartbeat timer.

13. The apparatus as claimed in claim 12 wherein the communication handler is configured to send a heartbeat message over a communication link in response to the data sent flag and the data receive flag not being set.

14. The apparatus as claimed in claim 13 wherein the data sent flag and the data receive flag are configured to be re-set in response to the heartbeat message being sent.

15. The apparatus as claimed in claim 9 further comprising a heartbeat state indicator coupled to the communication handler and configured to record a state of a heartbeat associated with the communication system.

16. A method for providing a performance neutral heartbeat in a computer communication system having a communications link, the method comprising:
maintaining a send flag;
maintaining a receive flag;
determining that a heartbeat timer has activated;
posting a plurality of system heartbeats;
for each system heartbeat of the plurality of system heartbeats;
checking a state of the send flag to determine if packets have been sent since a prior heartbeat timer activation;
checking a state of the receive flag to determine if packets have been received since a prior heartbeat timer activation, wherein each subsequent system heartbeat of the plurality of system heartbeats includes an identification of an increasing length of time since receipt of a last packet; and
in response to a passage of a predetermined number of system heartbeats, declaring the communications link not viable and recovering the communications link.

17. The method as claimed in claim 16 further comprising in response to the send flag being set, clearing the send flag.

18. The method as claimed in claim 16 further comprising in response to the send flag not being set, building a heartbeat message and sending the heartbeat message.

19. The method as claimed in claim 16 further comprising in response to the receive flag being set clearing the receive flag and setting a heartbeat state to an idle state.

20. The method as claimed in claim 16 further comprising in response to the receive flag not being set setting a heartbeat state to a timeout condition state.

* * * * *